Jan. 22, 1957 F. LEIGHTON 2,778,661
FLEXIBLE FLUID LINE COUPLING
Filed July 18, 1955 6 Sheets-Sheet 2

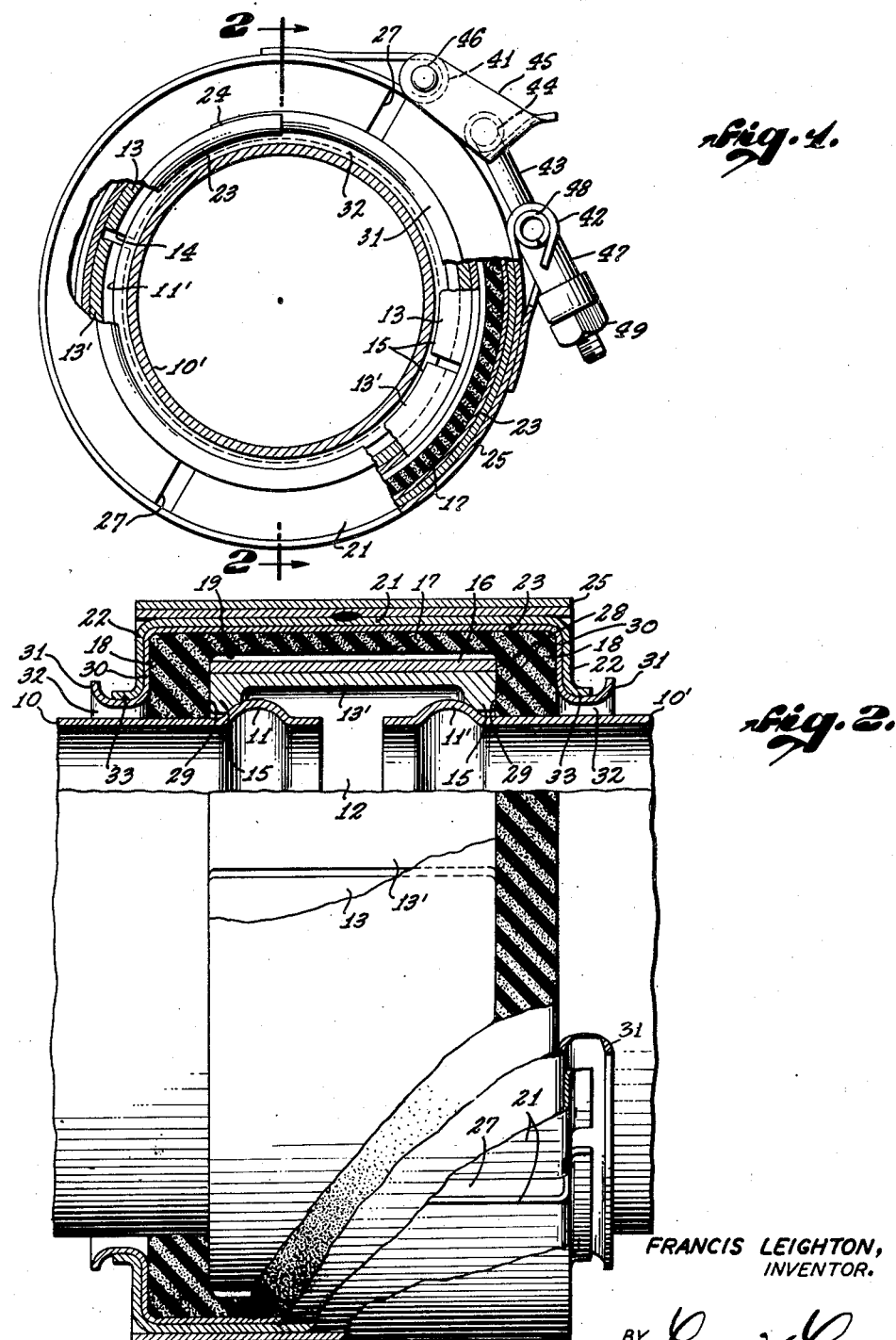

FRANCIS LEIGHTON
INVENTOR
BY Lynn Latta
-ATTORNEY-

Jan. 22, 1957　　F. LEIGHTON　　2,778,661
FLEXIBLE FLUID LINE COUPLING
Filed July 18, 1955　　6 Sheets-Sheet 3
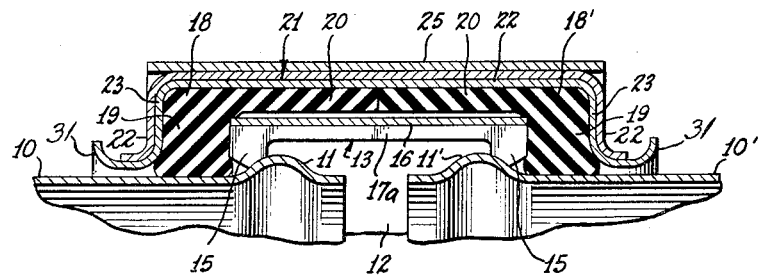
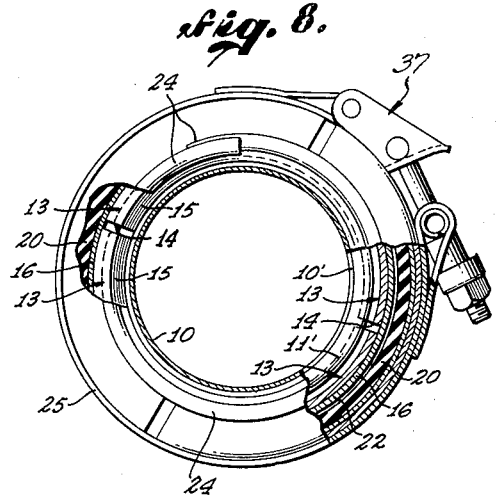
FRANCIS LEIGHTON,
INVENTOR.
BY Lynn H. Latta
ATTORNEY.

Jan. 22, 1957 F. LEIGHTON 2,778,661
FLEXIBLE FLUID LINE COUPLING
Filed July 18, 1955 6 Sheets-Sheet 4
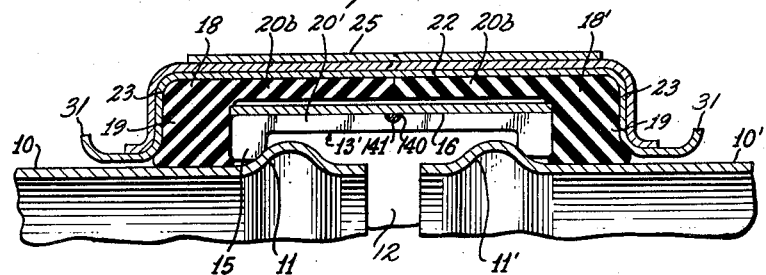
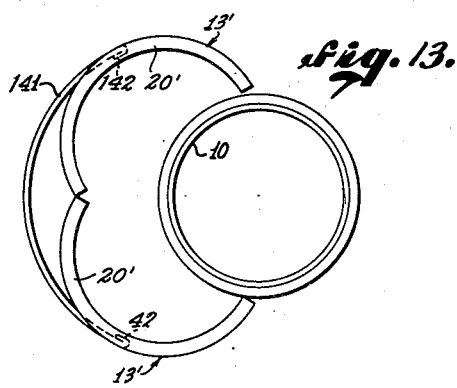
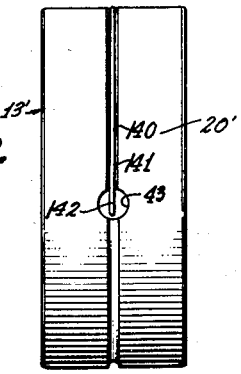
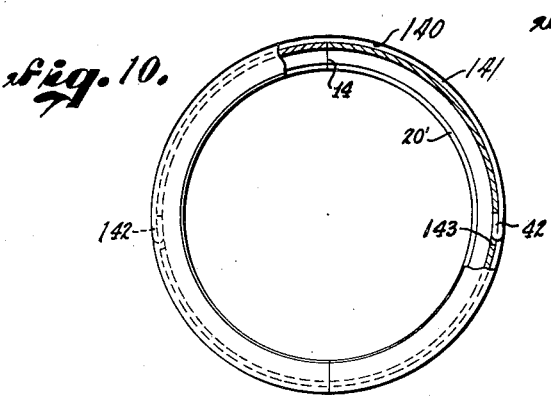
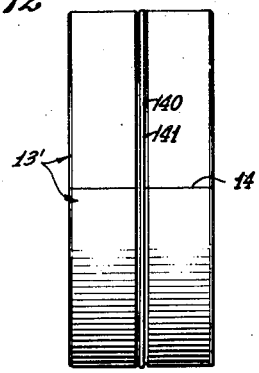
FRANCIS LEIGHTON,
INVENTOR.
BY Lynn H. Latta
ATTORNEY.

Jan. 22, 1957  F. LEIGHTON  2,778,661
FLEXIBLE FLUID LINE COUPLING
Filed July 18, 1955  6 Sheets-Sheet 5
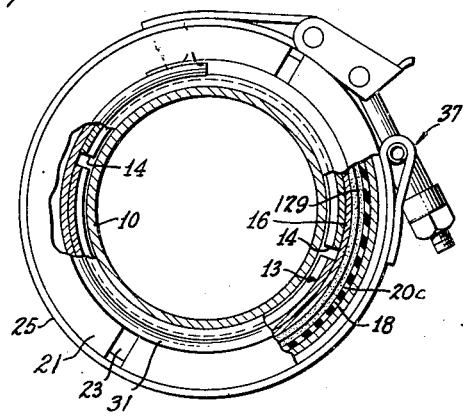
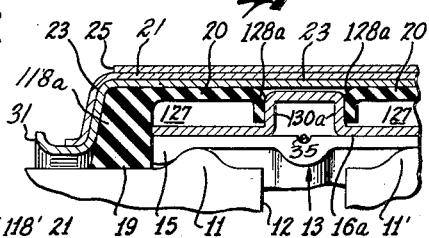
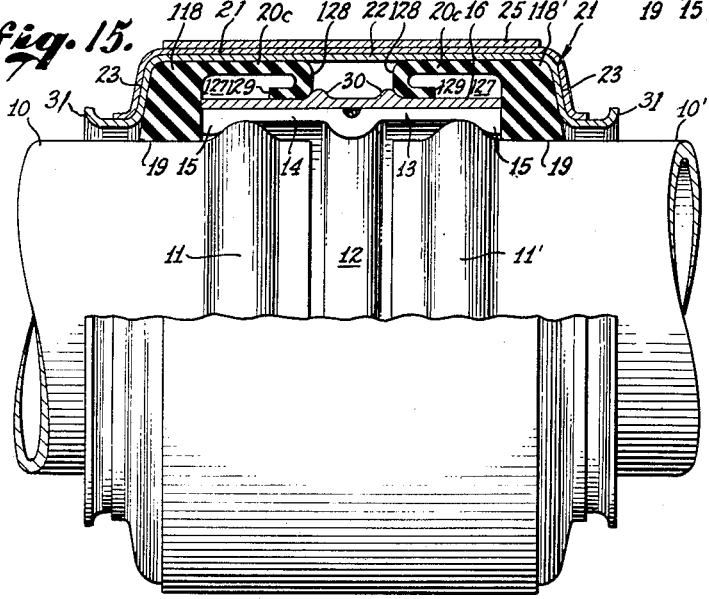
FRANCIS LEIGHTON,
INVENTOR.
BY *Lynn H. Latta*
ATTORNEY.

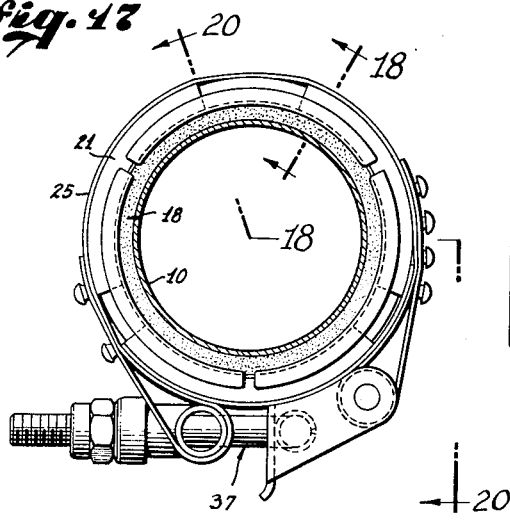
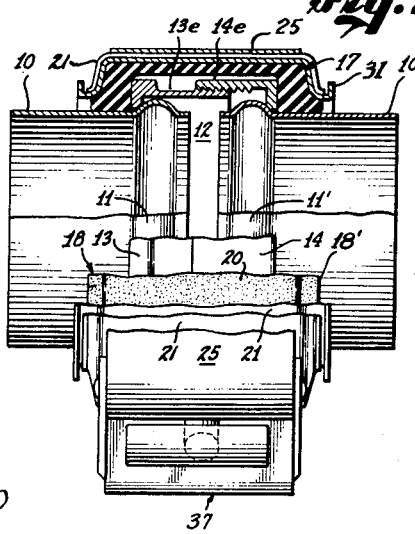
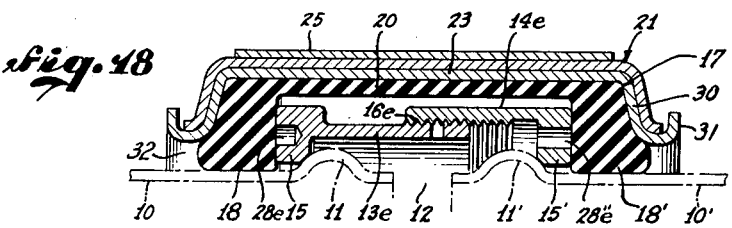
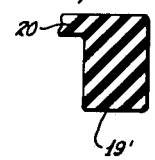
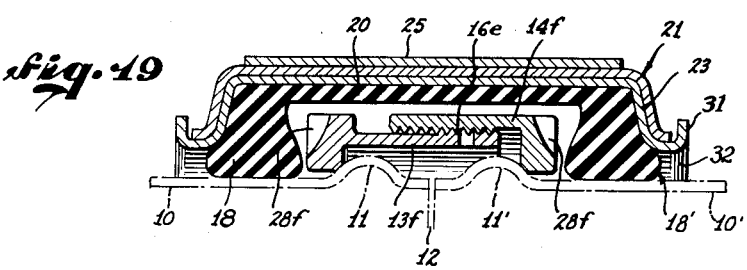
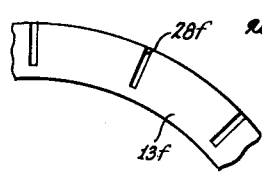
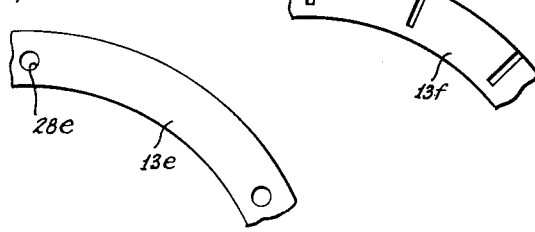
FRANCIS LEIGHTON, INVENTOR.

2,778,661
Patented Jan. 22, 1957

2,778,661

FLEXIBLE FLUID LINE COUPLING

Francis Leighton, Altadena, Calif., assignor, by mesne assignments, to Aeroquip Corporation, Jackson, Mich., a corporation of Michigan Application July 18, 1955, Serial No. 522,807

16 Claims. (Cl. 285—110)

This application is in part a continuation of my pending application Serial No. 354,562, filed May 12, 1953, now abandoned, and of my application serial number 499,465, filed April 5, 1955, now abandoned.

This invention relates to fluid line couplings. Its general object is to provide a coupling adapted to establish a fluid seal and a mechanical load transmitting joint between aligned tube sections having end beads for transmitting the load. An important object of the invention is to provide a coupling of the flexible type wherein the tube sections may shift to positions of misalignment of their axes, while the coupling maintains a good fluid seal between the tube sections.

An object of the invention is to improve upon a common type of tube coupling wherein the beaded ends of the tube sections are surrounded by packing means such as a sleeve or a pair of seal rings of compressible material (e. g. soft rubber, synthetic rubber or equivalent plastic material) and wherein the packing means in turn is surrounded by a sheath which confines the packing means in such a manner as to establish a fluid seal against both of the tube sections and also an end load transmitting mechanical connection between the tube sections.

In conventional tube couplings of this general type, the end loads developed by pressure in the fluid line tending to pull the tube sections apart, are transmitted through the compressible packing means interposed between the end parts of the sheath and the beads of the tube sections. This tends to wear out the packing means and also to sharply limit the maximum end load separation that can be transmitted without immediately damaging the packing means. With this problem in mind, a specific object of the invention is to provide a tube coupling adapted to transmit the end loads positively without imposing such end loads upon the packing means.

More specifically, the invention contemplates a coupling wherein compressible seal rings may be placed under just the right amount of compression to establish and maintain a good fluid seal between the tube sections while at the same time leaving the seal rings in a condition such that they may freely yield to accommodate mis-aligning movements of the tube sections.

Another object of the invention is to provide such a coupling wherein there is provided a direct, positive, mechanical, flexible connection of a pivotal type between the tubing beads and relatively rigid coupler segments; wherein a seal is established by packing means comprising a sleeve and a pair of seal rings; and wherein such packing means is contained by a sheath which remains in a floating condition, free of any direct mechanical connection with the tube sections, whereby the seal rings retain maximum freedom and yieldability for maintaining a fluid seal while accommodating mis-aligning movements.

Specifically, the invention contemplates a coupling wherein tubing beads are connected by rigid, end flanged coupler segments which in turn are retained by the hoop action of a retainer collar that is imperforate and circumferentially continuous so as to constitute a part of the fluid sealing means; wherein fluid seals are established between the respective ends of this retainer collar and the respective shiftable tube sections by soft compressible packing means of the type specified, sealed to the respective tube sections and to the ends of the collar respectively; and wherein such packing means is contained by a retainer sheath surrounding the same and having end flanges which are opposed to the ends of the retainer collar to retain the packing means therebetween and place the same under seal-maintaining compression.

One of the particular objects of this invention is to provide such a coupling wherein the packing means can be readily inserted over the tubing beads and over the retainer collar, thus to establish a fluid sealing connection bridging the ends of the tube sections through the coupler sleeve, the packing means being of sufficient dimension radially to bridge between the tube sections and the larger diameter retainer collar.

In one of its specific embodiments, the invention contemplates a coupling of the type outlined above, wherein respective sections of the packing means can be individually applied to the respective ends of the retainer collar.

A serious problem that has been encountered in a coupling of the type utilizing a sectional packing means, is met with where fluids under high pressures are transmitted through the coupling. The fluid pressure tends to open the seal between the packing means and the respective ends of the retainer collar, causing the fluid to escape to the outer side of the retainer collar, which is at atmospheric pressure. A particular object of the said specific embodiment is to provide an improvement in the type of coupling outlined above, wherein the packing means and retainer collar are arranged to provide, at each end of the retainer collar, two separate seals between each section of the packing means and the retainer collar, a first-stage seal being established by both axial compression of a part of the packing means against the end of the retainer collar and a second stage seal being established between the end of a projecting sleeve portion of the packing means and the cylindrical outer face of the retainer collar. More specifically, the invention aims to provide such a double seal structure wherein any fluid pressure which may pass the first seal will operate to increase the sealing engagement of the sleeve part of the packing means against the outer face of the retainer collar.

In another specific embodiment of the invention, a pair of sleeve sections are proportioned so as to substantially meet in end-abutting relation at a median radial plane of the coupling, normal to its axis, and to substantially fill the annular cylindrical space defined between the retainer collar and the radially opposed area of the sheath. In such embodiment, a fluid seal between the sleeve sections and the outer wall of the coupler collar may be established by arranging for the sleeve sections to be engaged under compression between the coupler collar and the sheath, or by having the ends of the sleeve sections abut one another under axial compression, or by utilizing both the radial and the axial compression of the sleeve sections.

In another specific embodiment, the invention utilizes a packing means, the sleeve portion of which is a single integral part extending continuously from one seal ring to the other and in itself establishing a bridging fluid seal between the two rings.

Other objects will become apparent in the ensuing specifications and appended drawings in which:

Figure 1 is a transverse sectional view through a line of tubing equipped with a coupling embodying the invention, parts of the coupling being broken away and shown in section to illustrate the interior construction thereof;

Figure 2 is a view of the same, partially in axial section and partially in side elevation, as indicated by the line 2—2 of Figure 1;

Figure 7 is a fragmentary axial sectional view of another modified form of the invention;

Figure 8 is an end view of the same, with the tubing and fragmentary portions of the coupling shown in section;

Figure 9 is a fragmentary axial sectional view of another modified form of the invention;

Figure 10 is an end view of the modified coupling collar;

Figure 11 is a side view of the positive coupler collar;

Figure 12 is a plan view of the segmental coupling collar;

Figure 13 is a schematic illustration of the operation of removing the modified coupling collar;

Figure 14 is an end view of a coupling embodying another modified form of the invention;

Figure 15 is a side view of the same, partially in axial section;

Figure 16 is a fragmentary axial sectional view of a further modification of the invention.

Fig. 17 is a radial sectional view of a tubing line embodying another modified form of the invenion and showing an end view of said modified form;

Fig. 18 is a fragmentary axial sectional view thereof;

Fig. 19 is a fragmentary axial sectional view of another modified form of the invention;

Fig. 20 is a view partially in axial section and partially in side elevation, taken on line 20—20 of Fig. 17;

Fig. 21 is a fragmentary end view of the connector collar of Fig. 18;

Fig. 22 is a fragmentary end view of the connector collar of Fig. 19; and

Fig. 23 is a fragmentary sectional view of the sealing boot.

Figure 3:
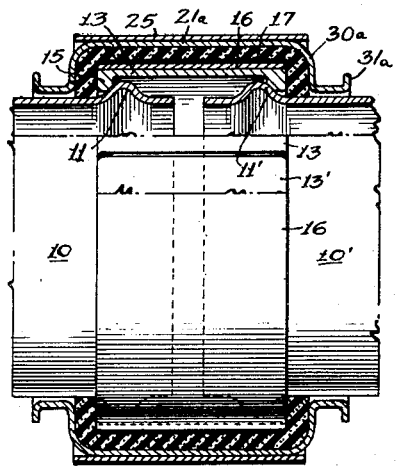
Figure 3 is an axial sectional view of a modified form of the invention.

Referring now to the drawings in detail, I have shown, as an example of one form in which the invention may be embodied, a coupling for joining the ends of tube sections which are indicated generally at 10 and 10'. The tube sections 10, 10' are provided near their ends with annular external beads 11, 11'; are separated by a gap 12; and are end-load-coupled by a generally cylindrical coupling collar comprising a plurality of collar segments 13, 13' which are separated by a plurality of gaps 14 disposed in axial planes. In the particular arrangement shown, there are two of the segments 13, 13', each of semi-cylindrical form. The segments 13, 13' have end flange parts 15 which engage behind the tubing beads 11, 11' to transmit positively the end loads between the tube sections 10, 10'. The segments 13, 13' are maintained locked against the beads 11, 11' by means of a retainer collar 16 which is circumferentially continuous and imperforate. Collar 16 may consist in a short length of cylindrical tubing. Collar 16 surrounds segments 13, 13', its internal diameter being substantially the same as the external diameter of the segments, but with sufficient clearance to receive the segments snugly therein.

The tubing beads 11 fulcrum against the end flange parts 15 of the coupler segments 13, 13' so as to accommodate misaligning movements of the tube sections. In such movement, the beads 11, 11' will fulcrum against the flanges 15 at one side of the coupling and will shift slightly toward one another, out of contact with flange parts 15 at the opposite side of the coupling. Also, there may be a slight amount of ball and socket sliding action between the beads 11, 11' and flange parts 15 where they retain contact.

The imperforate retainer collar 16 has two functions, namely (a) it is the means for locking the segments 14 to the tubing beads 11, 11'; and (b) it is a part of the fluid seal bridging between the tube sections 10, 10'. The remainder of the seal is constituted by packing means 17 comprising a pair of seal rings 18 sealed against the respective tube sections 10, 10' and a sleeve portion 20 which surrounds and is sealed to the retainer collar 16.

Defined within the sleeve portion 20 and between the seal rings 18 of the packing means 17 is an annular recess 19 in which collar segments 13, 13' and retainer collar 16 are received.

The packing means 17 is contained within a retainer sheath comprising a series of liner segments 23 each having a circumferential part in the form of a segment of a cylinder and an end member 30 projecting toward the coupling axis, and having a reinforcing foot 31 as its terminal portion. Segments 23 are secured, in circumferentially overlapping array about the circumference of a flexible connector band 25, and may be supported by thicker arcuate channel segments 21 interposed between them and the band 25. The various segments 21 and 23 may be spot welded to one another and to the band 25 in a manner such as to accommodate circumferential opening of the sheath when it is being applied over the ends of adjacent tube sections or being removed therefrom. The ends of band 25 are connected by a latching coupler of a well known type, which is indicated generally by the reference numeral 37.

Segments 13, 13' and retainer collar 16 have end faces 28 collectively defining radial end walls which are fitted against the radial inner walls 29 of seal rings 18. Liner 23 has end flanges 30 disposed in radial planes, the flanges 30 bearing against the outer end faces of seal rings 18. End walls 28 are spaced axially from flanges 30 to define flat annular spaces in which the seal rings 18 are confined and supported by bearing engagement against end walls 28 and flanges 30.

At their inner margins, liner flanges 30 are extended axially to provide feet 31 of somewhat greater radius than tube sections 10, 10', whereby annular spaces 32 are defined between tube sections 10, 10' and feet 31. Annular spaces 32 provide for some misalignment between tube sections 10, 10' and also constitute relief spaces into which the inner portions of seal rings 18 may be extruded when subjected to compression. Feet 31 are rolled outwardly at their outer ends to provide reinforcing flanges which stiffen the feet so that they will more accurately retain a circular contour. Flanges 22 of the retainer segments 21 are extended axially to provide terminal flanges 33 which bear against feet 31 of the liner. The bearing of terminal flanges 33 against feet 31 supports these members against yielding outwardly under the pressure of extruded material from seal rings 18. Similarly, the end flanges 22 of the segments 13, 13' bear against end flanges 30 of the liner to support end flanges 30 against yielding outwardly under the compression that is developed in seal rings 18 when band 25 is constricted.

The constrictor band 25 is a split band, its ends being formed into loops 41, 42, and being connected by the take-up connector 37 which may include a T-bolt 43 having a T-head 44 receivable in a quick-coupler latch 45 which is pivoted at 46 to loop 31. T-bolt 43 has a threaded end extending through a tubular T-fitting 47 having a cross head consisting in trunnions 48 journalled in the loop 42. A nut 49 is threaded onto the T-bolt and engages the end of T-fitting 47. It will be understood that this connector arrangement is shown merely as an example of a quick-coupler connector that may be utilized. Other types of connectors could be used.

*The invention as disclosed in Figures 1–6, inclusive*

In the particular embodiment of the invention disclosed in Figures 1 through 6, the sleeve portion 20 of the packing means 17 consists in a one-piece tubular part integrally joining seal rings 18 so as to establish a fluid seal bridging directly between the seal rings. Such bridging seal is assisted by the bridging seal established through retainer collar 16 as the result of sealing the ends of such collar to seal rings 18.

To assemble the coupling, the tube sections 10, 10' must be spread apart sufficiently to pass retainer collar 16 and packing means 17 through the gap 12 as thus widened. In some installations, this may necessitate placing the collar 16 and packing means 17 over one of the tube sections before the tube sections are secured in the fluid line assembly of which the coupling forms a part. Thereafter, with the tube sections fixed in the positions shown in Figure 2, it becomes possible to assemble the coupling by sliding the collar 16 and packing means 17 away from the beads 11, 11' onto one of the tube sections, exposing the beads so that segments 13, 13' may be placed therearound. After thus placing the segments 13, 13', the collar 16 is moved endwise onto and around the segments 13, 13' while they are held in assembled positions contacting the respective beads. Having thus established the mechanical connection between the tube sections, the fluid seal can be applied by moving the packing means 17 into abutting engagement with one end of the assembly of collars 13, 13', 16, then stretching the abutting seal ring 18 over the periphery of collar 16, then sliding the packing means 17 axially until the other seal ring 18 abuts against the same end of collar assembly 13, 13', 16, and then allowing the seal ring 18 which has just been stretched over collar 16 to contract around the other end of collar assembly 13, 13', 16 until it engages the adjacent tube section. Thereafter, the sheath 21, 23, 25 is arranged around the packing means 17, the connector 37, 43, 44, 45 etc., is manipulated to insert T-bolt head 44 into latch 45, and nut 49 is then rotated to tighten the connection, drawing the sheath tightly around the sheath 17.

Disassembly of the coupling may be accomplished by following a reverse order of steps.

Figure 4:
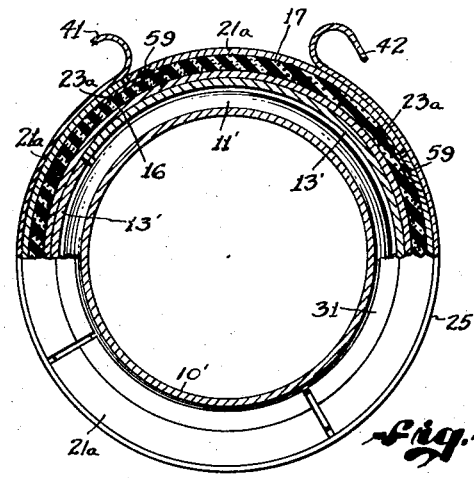
Figure 4 is a view of the same, partially in elevation and partially in radial section.
Figure 6:
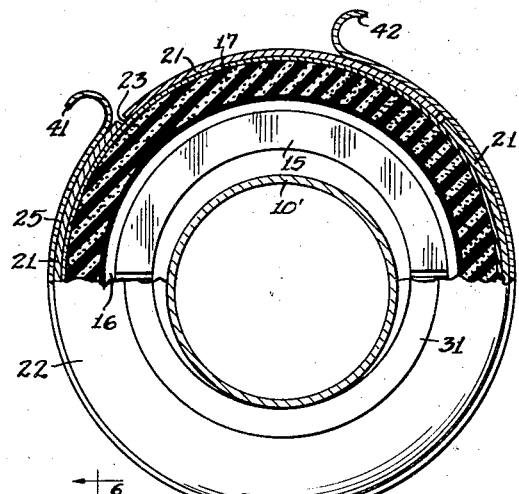
Figure 6 is a view thereof, partially in elevation and partially in radial section, taken as indicated by the line 6—6 of Figure 5.

Figures 3 and 4 disclose the invention as embodying a modified sheath structure in which a plurality of sheath segments 21a, of channel section, are in direct contact with the sealing sleeve 20, the gaps between the adjoining ends of the segments 21a being bridged by tongues 23a, and the liner 23 of Figures 1, 2 being omitted. Tongues 23a may be of channel section conforming to the channel shape of the inner wall of sheath 21a and each tongue may be spot welded as at 59 to a corresponding sheath segment 21a. The sheath segments 21a are provided with side flanges 30a and reinforcing end flanges 31a. In other respects, the arrangement shown in Figures 3 and 4 is the same as that of Figures 1 and 2, and the same reference numerals are used to identify the corresponding parts.

Figure 5:
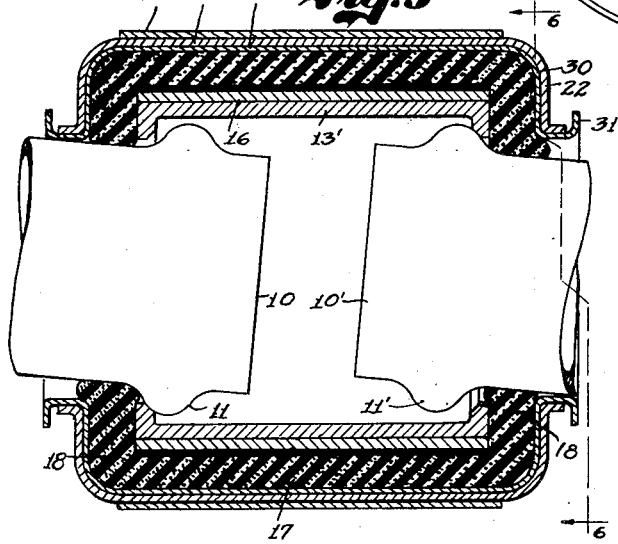
Figure 5 is an axial sectional view of a coupling embodying the invention, illustrating in an exaggerated manner how the coupling will accommodate misalignment of the tube sections.

Figure 5 illustrates, in a somewhat exaggerated manner, how misalignment of the tube sections may be accommodated by the coupling.

Since the beads 11, 11' bear directly against the flanges 15, any pivotal movements between tube sections and the coupling members which may occur as the result of misaligning tilting of the tube sections, will involve metal to metal bearing contact, and the grinding of the tubing beads against the respective end portions of a sealing sleeve of soft material such as rubber, will be completely avoided. Thus, the seal rings are protected and preserved. As the tube sections shift to positions of misalignment, the inner margins of the seal rings, under the pressure applied to them by the sheath, will follow and remain sealed against the tube sections.

A primary advantage of the invention resides in the fact that the fluid seal between the tube sections is established independently of the mechanical end load bearing connection across beads 11, 11' afforded by segments 13, 13' and retainer collar 16. Thus, the seal rings remain completely free of the end loads that are transmitted through segments 13, 13', and the compression in the seal rings may be limited to just a sufficient pressure to insure the adequate sealing of the joints against the escape of fluid pressure through gap 12.

*The invention as disclosed in Figures 7–13, inclusive*

In the form of the invention disclosed in Figures 7–13, inclusive, the packing means is divided, on a median plane of the coupling, normal to its axis, into two sections or gaskets 18, 18' each including a seal ring 19 and a sleeve section 20b. Seal rings 19 are generally of flat ring form, having generally radial faces which are engaged under slight compression between the respective ends of retainer collar 16 and flange parts 15, at their inner faces; and end flanges 30 of sheath segments 23 at their outer faces. To establish such compression, the seal rings 19 have their axial thickness somewhat greater than the spacing between the ends of retainer collar 16 and end members 30. In addition to being under compression axially, seal rings 19 in the closed coupling are placed under radial compression between the circumferential wall portions of the sheath segments 23 and the outer wall of tube sections 10, 10'. This is accomplished by drawing the sheath segments 21 around the gaskets to contract the diameter of the sheath, as will presently be described. With the seal rings 19 of the gaskets thus placed under compression the radially inner extremities thereof will tend to bulge axially as shown in Fig. 2. The radial compression is sufficient so that, as the respective tube sections have pivotal movement, fulcrumming against flange parts 15, and shifting radially toward the feet 31 of the sheath segments on one side and away from feet 31 on the opposite side of the coupling, the seal rings 19 of the gasket parts may compress to a greater extent at one side and expand radially on the opposite side while maintaining a good fluid seal around the circumference of the tube sections.

A good fluid seal between the sleeve portions 20b of the packing means and the outer wall of retainer collar 16 is established by compression of the sleeve portions 20b between the sheath segments 23 and the retainer collar 16. To minimize the tendency of fluid under higher pressures to force its way between the retainer collar 16 and the inner walls of sleeve portions 20b, expanding the latter outwardly, the area of contact between sleeve portions 20b, and retainer collar 16, in the form of Figure 7, is extended to a maximum by making the sleeve portions 20b long enough to completely bridge the axial extent of collar 16. Optionally, the ends of the sleeve portions 20b may be brought into contact with one another and placed under some compression to further add to the seal.

Referring now to Figures 9–13, I have shown therein an improved form of the segmental coupler collar, comprising a pair of segments 13' each including a semi-cylindrical body 20' having, midway between its ends, in its outer wall, a semi-circular groove 140.

A spring yoke 141, of approximately semi-circular configuration, formed of spring wire, lies in the annular grooves 140. It has hooks 142 at its respective ends, formed as return bends. Hooks 142 engage in recesses 143 located at the centers of the respective semi-cylindrical body parts 20' and communicating with the respective grooves 140. Spring 141 bridges across one of the gaps 14 between adjoining ends of segments 13' and constitutes a resilient connection between the segments 13', allowing them to be sprung open as in Figure 13 to receive the tube sections 10, 10'. When released, they will close on the tube ends, gripping them lightly to establish a temporary assembly pending attachment of the remaining components of the coupling.

The engagement of hooks 142 in recesses 143 hooks the respective arms of the spring yoke 141 to the segments so that the yoke will not release the segments when the collar is opened.

*The invention as disclosed in Figures 14 and 15*

Referring now to Figures 14 and 15, the modification disclosed therein utilizes a packing means comprising two sections or gaskets 118, 118' composed of two sleeve portions 20c, each integrally joined to a respective seal ring 19. As in the modification shown in Figures 7–15, the seal rings 19 are proportioned so as to be placed under radial compression when the sheath is tightened around the packing means, and so as to be snugly engaged between the end parts of the sheath and segmental coupler collar and the ends of the retainer collar 16, and sealed to the latter and to the tube sections respectively.

The sleeve portions 20b of the gaskets are of substantially larger diameter than retainer collar 16, being separated therefrom by annular spaces 127. At their ends, sleeve portions 20c have radially inwardly projecting feet 128 bearing against the outer wall of coupler sleeve 16 and terminating in reentrant toe flanges 129 that are spaced radially inwardly from the inner wall of cuff bodies 20c. Toe flanges 129 are thin and highly flexible and initially engage the wall of retainer collar 16 with a hugging contact derived from the compression established in foot portions 128 when the sheath is contracted around the gasket. In the subsequent operation of the coupling, with fluid pressure in the line, if the pressure should rise to a point where it opens the seal between a seal ring 19 and the adjoining end of retainer collar 16, such pressure will enter annular chamber 127 and react between the toe flanges 129 and the opposed body of sleeve portions 20c, tending to spread them into tighter engagement with the collar 16 and the sheath respectively. Thus the greater the pressure, the tighter the toe flanges 129 will be sealed against the collar 16.

The foot portion 128 has an axial dimension considerably greater than the thickness of toe flange 129, this dimension being preferably as great as the radial thickness of the foot portion, so as to avoid any tendency for the foot portions of the respective gaskets to yield toward one another under high pressure.

Retainer collar 16 is preferably provided with two annular shoulders 130 against which feet 128 are seated, in response to pressure in chambers 127, preventing the pressure in chambers 127 from displacing feet 128 toward one another and "blowing by" the feet 128.

*The invention as disclosed in Figure 16*

In the modified form of the invention shown in Figure 16, the inner foot portions 128a of the respective gaskets 18a are seated against shoulders 30a in retainer collar 16a, and are sufficiently flexible so as to increase the tightness of their seating in proportion to any increase in fluid pressure in chambers 127. Thus the toe flanges 129 may be dispensed with in this form of the invention. The principle of double sealing at the ends of collar 16 and at the inner ends of sleeve portions 20c, is embodied in this modified coupling, as in the preferred form previously described.

Even though high pressure does break the seal at the ends of collar 16, there will be a considerable pressure drop past the ends of the collar, and the pressure in chambers 127 will be considerably lower than line pressure, so that full line pressure is never imposed on sealing parts 128, 129, 128a. Thus the invention provides a two-stage sealing action which becomes effective to maintain a seal in the presence of pressures in the higher range which would cause leakage in a conventional coupling.

In the forms of the invention shown in Figs. 17 to 23 inclusive, the load bearing connector collar, instead of the radially separable collar segment and surrounding retainer collar of the previous forms of the invention, consists in a pair of collar sections 13e, 14e each of which is circumferentially continuous, and which are joined at the center of the coupling for axial separation. The means for securing the collar sections together, instead of the retainer collar 16, comprises male and female threads mating with one another to provide an axially adjustable threaded connection 16e. A selected amount of end loading may be imposed upon the tube sections by drawing the collar sections 13e, 14e tightly against the beads 11, 11'.

For adjusting the coupling collar, the collar sections are provided, in Figs. 18 and 22 with sockets 28e to receive the prongs of a pair of spanner wrenches. Alternatively, the ends of collar sections 13f, 14f as shown in Figs. 19 and 22 may be provided with radial slots 28f.

Fig. 23 illustrates the normal cross sectional shape of gasket 19' (rectangular) prior to the application of compression thereto by the retainer sheath.

One of the important features of the invention is the relationship between the constrictor band, the sheath or casing, and the gaskets at the respective ends thereof. The radial forces applied by the constrictor band is applied to the sheath midway between its ends. These radial forces are transmitted from the ends of the sheath to the gaskets. Thus the arrangement functions as a center-loaded beam, with the radial forces being distributed outwardly to the ends of the sheath and then to the gaskets with an equalizing distribution of the radial forces. At the same time, the tube sections remain relatively free for misaligning movements.

I claim:

1. In a tube coupling, in combination: a pair of tube sections having external annular end beads; a plurality of collar segments collectively constituting a connector collar of larger diameter than said beads, adapted to surround said beads and having end flanges extending radially inwardly and directly engaging the remote sides of the beads to establish an end-load bearing connection directly between the tube sections, with the ends of the tube sections out of contact with one another; a circumferentially continuous retainer collar surrounding said segmental collar and bearing against the periphery thereof to hold the segments against spreading; a sleeve of soft compressible resilient material surrounding said retainer collar; a pair of seal rings integral with the respective ends of said sleeve and extending radially inwardly therefrom in engagement with the ends of said retainer collar and segmental collar and in direct sealing engagement with said tubing sections, said sleeve and seal rings cooperatively defining an annular recess in which the collars are received; and a sheath of split collar form surrounding and confining and supporting said sleeve and the seal rings.

2. In a tube coupling, in combination: a pair of tube sections having external annular end beads of rounded cross section; a plurality of collar segments collectively constituting a connector collar of larger diameter than said beads, adapted to surround said beads and having end flanges extending radially inwardly and in universally pivotal engagement with the remote sides of the beads to establish an end-load-bearing connection directly between the tube sections with the ends of the tube sections spaced from one another to accommodate relative pivotal movement between the beads and said end flanges; a circumferentially continuous retainer collar surrounding said segmental collar and bearing against the periphery thereof to hold the segments against spreading; a sleeve surrounding said retainer collar; a pair of seal rings integral with the respective ends of said sleeve and extending radially inwardly therefrom past the ends of said retainer collar and segmental collar for direct sealing engagement against said tubing sections, said sleeve and seal rings co-operatively defining an annular recess in which the collars are received, and being of a soft, compressible, resilient material such as to follow the tube sections in their pivotal movements and to constantly maintain a seal; and a sheath of split collar form surrounding and confining and supporting said sleeve and the seal rings; said sheath being of channel section, including end flanges embracing outer sides of said seal rings.

3. A tube coupling as defined in claim 2, including take-up connector means joining the ends of said sheath for constricting the same about said sleeve and seal rings, for establishing compression in said seal rings such that they will maintain sealing engagement with said tube sections during said pivotal movements.

4. A tube coupling as defined in claim 3, wherein the radial faces of each seal ring are engaged under compression between the ends of said segmental collar and said retainer collar on one side, and the end flanges of said sheath on the other side.

5. A tube coupling as defined in claim 1, wherein said segmental collar and retainer collar are of the same length, equal to the distance between the inner faces of said seal rings, and have end faces lying in common radial planes and engaged against and supporting said inner faces of the seal rings.

6. A tube coupling as defined in claim 1, wherein said sheath includes a liner of thin channel section in the form of a split collar extending around the full circumference of said sleeve and having overlapping ends, a plurality of segments of channel section collectively constituting a restrainer collar surrounding said liner, a constrictor band encircling and secured to the respective segments of said restrainer collar, and take-up connector means joining the ends of said constrictor band and adapted to contract said band so as to apply constricting pressure to said restrainer segments, thence to said liner and thence to said sleeve and seal rings.

7. A tube coupling as defined in claim 2, wherein said segmental collar and retainer collar are of the same length and have ends lying in common radial planes, said seal rings being of rectangular cross-section, having radial inner faces spaced apart a distance corresponding to the length of said collars and engaging and supported by said radial end faces thereof, said end flanges of the sheath being disposed in parallel radial planes and spaced apart a distance corresponding to that between the outer faces of said seal rings, and engaging said seal rings to confine and support them, said coupling further including take-up connector means joining the ends of said sheath for constricting the same about said sleeve and seal rings, for establishing compression in said seal rings such that they will maintain sealing engagement with said tube sections during said pivotal movements.

8. A coupling as defined in claim 2, wherein said sheath comprises a plurality of segments of channel section arranged in circumferentially end-abutting relation, each segment having a relatively thin tongue of conforming channel section projecting from one end thereof and underlapping the opposite end of an adjoining segment.

9. A tube coupling as defined in claim 1, wherein said sleeve is sectional, comprising a pair of axially opposed sleeve portions each joined integrally to a respective seal ring, said sleeve portions collectively extending at least a majority of the distance between the seal rings and having a wall thickness proportioned to the radial dimension between the sheath and retainer collar members so as to provide for said sleeve portions being engaged snugly between said members and thus sealed to the peripheral wall of said retainer collar.

10. A tube coupling as defined in claim 2, wherein said sleeve is sectional, comprising a pair of axially opposed sleeve portions each joined integrally to a respective seal ring, said sleeve portions collectively extending at least a majority of the distance between the seal rings and having a wall thickness proportioned to the radial dimension between the sheath and retainer collar members so as to provide for said sleeve portions being engaged snugly between said members and thus sealed to the peripheral wall of said retainer collar; said seal rings being engaged under axial compression between the end parts of said segmental connector collar and said retainer collar and the end flange parts of said sheath, and under radial compression between the internal peripheral wall of said sheath and the external walls of said tube sections, for establishing respective seals between said external walls and the respective ends of said retainer collar.

11. A tube coupling as defined in claim 1, wherein said sleeve is sectional, comprising a pair of axially opposed sleeve portions each joined integrally to a respective seal ring, said sleeve portions having inner ends in abutting engagement with one another under axial compression and having a wall thickness proportioned to the radial dimension between the sheath and retainer collar members so as to provide for said sleeve portions being engaged snugly between said members and thus sealed to the peripheral wall of said retainer collar.

12. A tube coupling as defined in claim 1, wherein said sleeve is sectional, comprising a pair of axially opposed sleeve portions each joined integrally to a respective seal ring, said sleeve portions collectively extending at least a majority of the distance between the seal rings and having a radial thickness substantially less than the radial depth of an annular space that is defined between the sheath and the outer wall of said retainer collar, said sleeve portions including foot portions extending radially inwardly from opposed inner ends thereof and seated against said retainer collar so as to define, between said foot portions and said seal rings, fluid chambers wherein any fluid escaping past the seals between said seal rings and the ends of said retainer collar, will be effective to establish fluid-energized seals between said foot portions and said retainer collar.

13. A tube coupling as defined in claim 1, wherein said sleeve is sectional, comprising a pair of axially opposed sleeve portions each joined integrally to a respective seal ring, said sleeve portions collectively extending at least a majority of the distance between the seal rings and having a radial thickness substantially less than the radial depth of an annular space that is defined between the sheath and the outer wall of said retainer collar, said sleeve portions including foot portions extending radially inwardly from opposed inner ends thereof and seated against said retainer collar so as to define, between said foot portions and said seal rings, fluid chambers wherein any fluid escaping past the seals between said seal rings and the ends of said retainer collar, will be effective to establish fluid-energized seals between said foot portions and said retainer collar, said foot portions including relatively thin toe flanges bearing against the outer wall of said retainer collar.

14. A tube coupling as defined in claim 1, wherein said sleeve is sectional, comprising a pair of axially opposed sleeve portions each joined integrally to a respective seal ring, said sleeve portions collectively extending at least a majority of the distance between the seal rings and having a radial thickness substantially less than the radial depth of an annular space that is defined between the sheath and the outer wall of said retainer collar, said sleeve portions including foot portions extending radially inwardly from opposed inner ends thereof and seated against said retainer collar so as to define, between said foot portions and said seal rings, fluid chambers wherein any fluid escaping past the seals between said seal rings and the ends of said retainer collar, will be effective to establish fluid-energized seals between said foot portions and said retainer collar, said retainer collar having a pair of annular radial shoulders disposed between said foot portions and against which said foot portions are sealed by said fluid-energized seals.

15. In a tube coupling, in combination: a pair of tube sections having respective external annular end beads; a plurality of collar sections collectively constituting a connector collar of larger diameter than said beads, surrounding said beads and having end flanges extending radially inwardly and directly engaging the remote sides of the beads to establish an end-loading bearing connection directly between the tube sections, with the ends of the tube sections out of contact with one another; rigid means for providing a separable connection between said collar sections; a sleeve of soft compressible resilient material surrounding said connector collar; a pair of seal rings integral with the respective ends of said sleeve and extending radially inwardly therefrom in engagement with the ends of said connector collar and in direct sealing engagement with said tubing sections, said sleeve and seal rings cooperatively defining an annular recess in which the said connector collar is received; and a sheath of split collar form surrounding and confining and supporting said sleeve and the seal rings.

16. A flexible tube coupling as defined in claim 15, wherein said collar sections are circumferentially continuous, each surrounding a respective tubing bead; and wherein said separable connection comprises respective male and female threads on the respective collar sections, in threaded engagement with one another and providing for adjustment of the axial spacing between said end flanges of said connector collar.

References Cited in the file of this patent

UNITED STATES PATENTS

| | | |
|---|---|---|
| 1,622,768 | Cook et al. | Mar. 29, 1927 |
| 2,460,981 | Francisco et al. | Feb. 8, 1949 |

FOREIGN PATENTS

| | | |
|---|---|---|
| 430,676 | Great Britain | June 24, 1935 |